Jan. 7, 1941.　　A. M. SOFIELD ET AL　　2,228,237
CONNECTING DEVICE
Filed Aug. 23, 1940
Fig.1.
Fig.2.
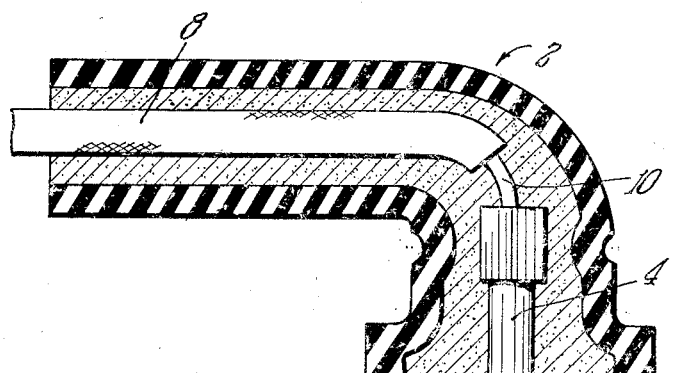
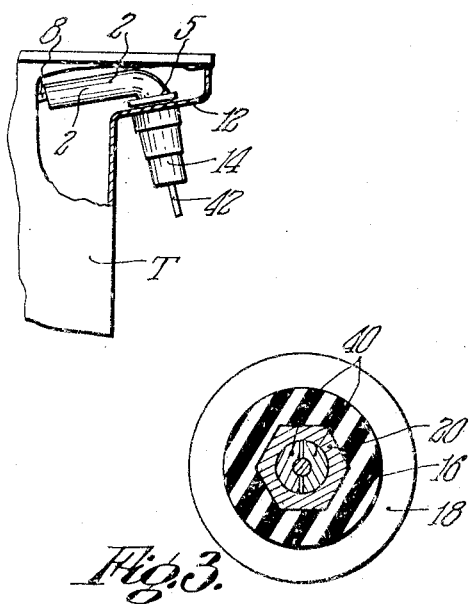
Fig.3.
INVENTOR.
Alfred M. Sofield
BY Harold R. Gladden
Walter C. Rom. Attorney.

Patented Jan. 7, 1941

2,228,237

UNITED STATES PATENT OFFICE 2,228,237

CONNECTING DEVICE

Alfred M. Sofield, Springfield, and Harold R. Gladden, Chicopee, Mass., assignors to American Electric Service & Maintenance Co., Springfield, Mass., a corporation of Massachusetts Application August 23, 1940, Serial No. 353,854

2 Claims. (Cl. 173—363)

Our invention relates to improvements in connecting means for electric wires, conductors, cables and the like.

The principal objects of the invention are directed to the provision of connecting means for cables, wires and the like which are characterized by their simplicity, and their ease and efficiency of operation.

Various devices have been provided for connecting wires and cables, but have been relatively complicated, costly, and require the use of various tools. According to this invention, there is provided a device which not only is characterized by its simplicity but also may be used for its intended purpose without the necessity for tools or the like.

The connecting means of our invention is adapted for broad application wherever it is desired to connect electrical wires, cables, conductors and the like, but to facilitate a clear understanding of the novel features thereof, the construction will be described in connection with a transformer or similar apparatus where it is usual to connect a lead or leads thereof to an external wire or cable which may extend to a power line or to some other apparatus.

Various novel features and advantages of the construction of the connecting device of the invention will be more fully referred to in connection with the accompanying description of the present preferred embodiment thereof taken in connection with the accompanying drawing wherein:

Fig. 1 is a sectional elevational view through a connecting device embodying the novel construction of the invention;

Fig. 2 is a small scale partial sectional view of a transformer casing or housing to explain one way of using the construction of the invention with a transformer; and Fig. 3 is a sectional plan view on the line 3—3 of Fig. 1.

Referring now to the drawing more in detail, the invention will be fully described, it being understood that various changes and modifications may be made in the form of the apparatus without departing from the spirit and scope thereof.

A bushing is represented at 2 which may be made in any shape and may be made from any suitable material such as ceramic, porcelain, or the like. The bushing is hollow or has a chamber for a compound of some suitable type in which is embedded and held against rotation a stem or stud 4. The lower end of the stud is threaded at 6 as is shown. A conductor or cable 8 may have its wire or wires 10 secured to the upper side of the stem in any suitable manner as by soldering the wire or wires in a socket of said stud.

The form of the member 2 may be varied as desired but in the form of the invention being described the bushing is adapted to be secured to the wall 12 or transformer casing T.

A connector is represented generally at 14 and this may consist of a hub 16 from which depends a skirt or annular wall part 18. The member 14 will preferably be made from some suitable insulating material of which there are many. A tubular member 20 extends through an opening in the hub part 16 and it may have a head 22 which bears against one side of the hub while the washer 24 around the member 20 bears against the other side of the hub. The member 24 may be secured to the member 20 in any suitable manner so that with the head 22 said member 20 is held against axial displacement relative to the hub. The member 20 is preferably of some suitable metallic material and it has an opening 26 in its lower side. The member 20 and the opening in the member 14 are preferably arranged to prevent rotation of said member 20.

A nut 28 is provided in the upper side of the member 20 and it may be secured therein, by any suitable means, so as to be held against rotation, as by peening or spinning the end of the member 20 at 30.

Said member 28 is provided with a threaded socket to receive the threaded end 6 of the stud 4. A pressure member 36 is slidable in the upper end of the bore of the member 20 as shown and it has a depending peripheral portion that is provided with inner downwardly converging faces. The lower end of the bore of the member 20 has upwardly extending diverging faces 38 which are opposite to the inner faces of member 36.

Two or more clutch or jaw members 40 are disposed within the bore of the member 20 and these are provided with curved inner grooves to provide a bore for receiving a wire or wires W of an electrical cable or conductor 42.

The member 2 preferably has a depending annular wall portion 3 which more or less surrounds the upper part of the member 14 thereby, as shown, to protect the metallic parts of the connector.

In operation the bushing 2 in the particular form shown, and with a wire or wires of a conductor or cable connected to the stud thereof may be suitably associated with a transformer housing. A collar such as 5 may be secured to the housing for holding the bushing in place although other means may be employed. When so associated with the housing the lower threaded end of the stud 4 projects downwardly from the bushing and the conductor 8 may represent a lead from the transformer.

The conductor or cable which it is desired to connect to that of the bushing is represented by 42 and it may consist of a connection to a power line or some type of apparatus. With the connector 14 disconnected from the bushing the wire or wires W of conductor 42 are inserted in the bore of jaw members 40 and then the connector is screwed onto the threaded end 6 of the stud 4 so that the said end bears on member 36 which causes the jaw members to move inwardly whereby they securely clamp the wire or wires W.

Thus in making the connection, member 14 is merely rotated and the wire or wires of cable 42 are clamped and connected to the stud to which the wire or wires 10 are connected. Should it be desired or necessary member 14 is rotated in an opposite direction to bring about disconnection.

It will be evident that the connection is made easily and readily without the necessity of using special or, in fact, any tools and that the construction is such as to facilitate economy in manufacture and operation while at the same time the novel construction affords protection against the elements whilst maintaining the desired electrical connection.

The invention has been described in connection with a transformer where it is desired to connect the transformer lead to a conductor readily and efficiently but it will be obvious that the novel features of the invention are adapted for broad application where it is desired to connect electrical conductors, wires, or cables of all kinds and for many and various purposes.

Manifestly the specific details of construction may be considerably varied from those herein shown and described without involving any departure from the principle of the invention or sacrificing any of the advantages inherent therein. While I have described my invention in this specification in great detail and particularly with respect to the present preferred form thereof, it is not desired to be limited thereto since many changes and modifications may be made therein without departing from the spirit and scope of the invention.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A conductor connecting device of the class described comprising in combination, a bushing of insulating material having a bore, compound in said bore, a stem embedded in said compound having an upper conductor connecting end and a lower threaded end projecting from said compound for detachably connecting to a connector unit and simultaneously operating conductor clamping means associated therewith, a connector of insulating material having a bore, a member fixed in the upper end of said bore having a longitudinally extending chamber therein closed at its lower end by a wall provided with a conductor receiving opening and at its upper end by a threaded socket in which said stem is receivable, clamp members enclosed in said chamber for receiving therebetween a conductor and being movable radially between retracted conductor clamping and expanded non-clamping positions, and actuating means associated with said chamber and clamp members for moving said clamp members from non-clamping to clamping position operable by the said stem when screwed into said socket, all adapted and arranged whereby with a conductor between said clamp members as the stem of the bushing is screwed into the threaded socket the said bushing and connector are detachably secured together and the conductor is clamped in said connector.

2. A conductor connecting device of the class described comprising in combination, a bushing of insulating material having a bore, compound in said bore, a stem embedded in said compound having an upper conductor connecting end and a lower threaded end projecting from said compound for detachably connecting to a connector unit and simultaneously operating conductor clamping means associated therewith, a connector of insulating material having a bore, a member fixed in the upper end of said bore having a longitudinally extending chamber therein closed at its lower end by a wall provided with a conductor receiving opening and at its upper end by a threaded socket in which said stem is receivable, clamp members enclosed in said chamber for receiving therebetween a conductor and being movable radially between retracted conductor clamping and expanded non-clamping positions, and actuating means associated with said chamber and clamp members for moving said clamp members from non-clamping to clamping position operable by the said stem when screwed into said socket, all adapted and arranged whereby with a conductor between said clamp members as the stem of the bushing is screwed into the threaded socket the said bushing and connector are detachably secured together and the conductor is clamped in said connector, said actuating means including complemental wedging surfaces on the lower portions of the clamp members and chamber and wedging surfaces on the upper portions of said clamp members co-operating with a member thereabove and acting thereon which is engageable by said stem.

ALFRED M. SOFIELD.
HAROLD R. GLADDEN.